(No Model.) 2 Sheets—Sheet 1.

H. CAMPBELL.
CEMENT KILN.

No. 591,813. Patented Oct. 19, 1897.

Witnesses:
Geo. W. Young,
N. E. Oliphant

Inventor
Henry Campbell
By H. G. Underwood
Attorneys (No Model.) 2 Sheets—Sheet 2.
H. CAMPBELL.
CEMENT KILN.
No. 591,813. Patented Oct. 19, 1897.
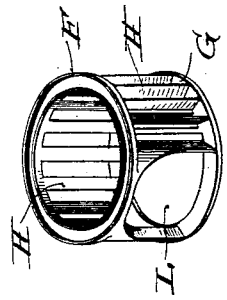
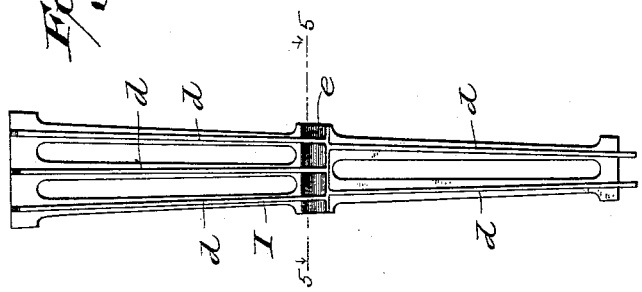
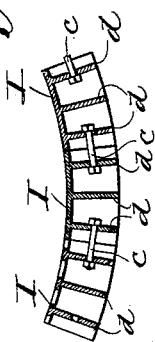
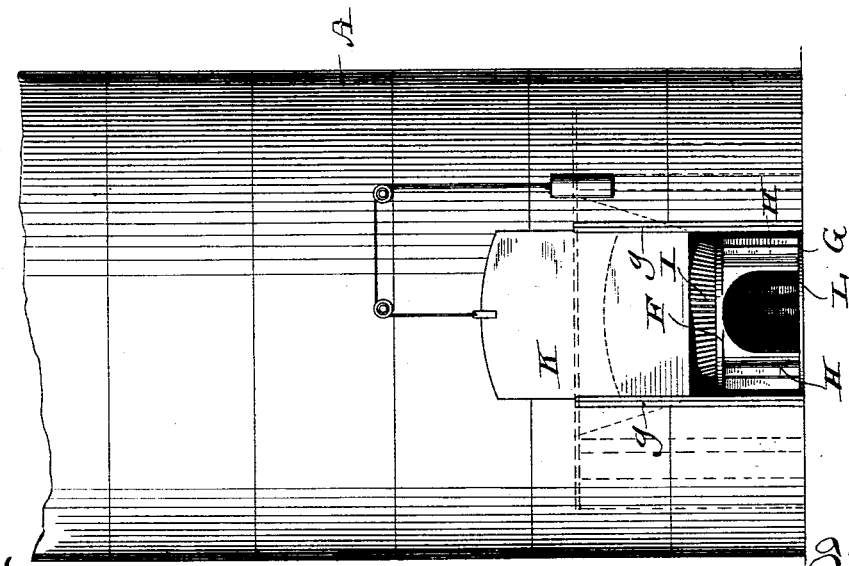
Witnesses:
Geo. W. Young
N. E. Oliphant
Inventor
Henry Campbell
By H. G. Underwood
Attorneys

UNITED STATES PATENT OFFICE.

HENRY CAMPBELL, OF MILWAUKEE, WISCONSIN, ASSIGNOR OF ONE-FOURTH TO PHILIP GORDON CAMPBELL, OF SAME PLACE.

CEMENT-KILN.

SPECIFICATION forming part of Letters Patent No. 591,813, dated October 19, 1897.

Application filed July 6, 1896. Serial No. 598,099. (No model.)

*To all whom it may concern:*

Be it known that I, HENRY CAMPBELL, a citizen of the United States, and a resident of Milwaukee, in the county of Milwaukee and State of Wisconsin, have invented certain new and useful Improvements in Cement-Kilns; and I do hereby declare that the following is a full, clear, and exact description thereof.

My invention has for its object to increase the capacity of a standard-size cement-kiln, improve the product, avoid waste, and save fuel. Hence it consists in certain peculiarities of construction and combination of parts hereinafter specified with reference to the accompanying drawings and subsequently claimed, especial reference being had to the pot portion of the kiln.

Figure 1:
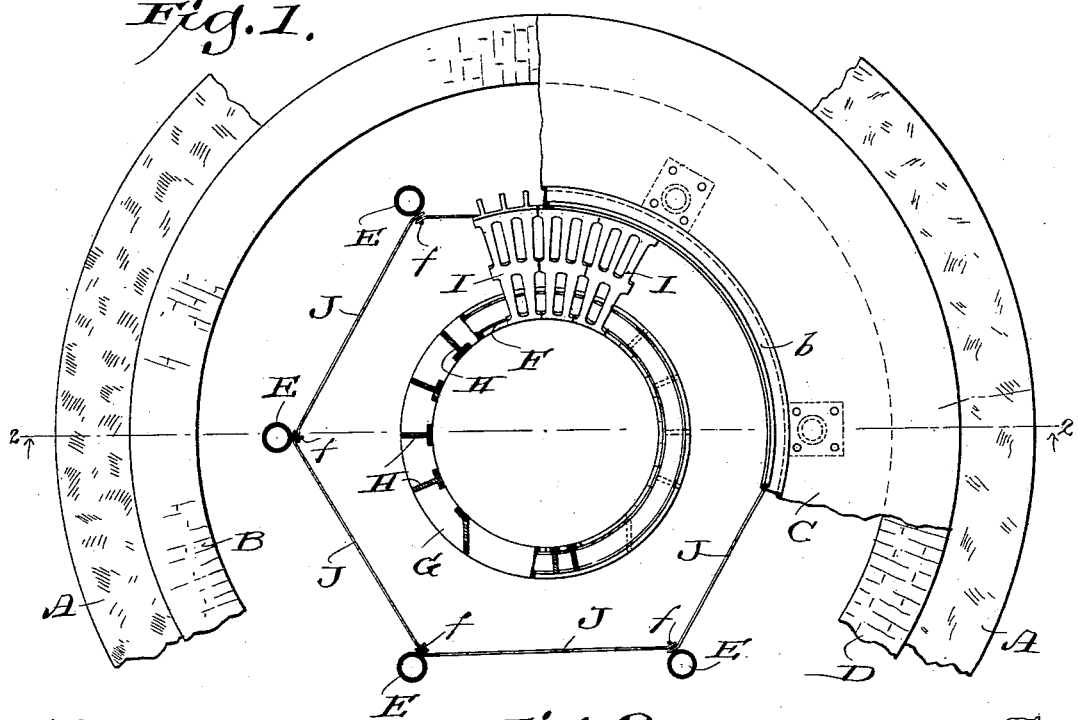
Figure 2:
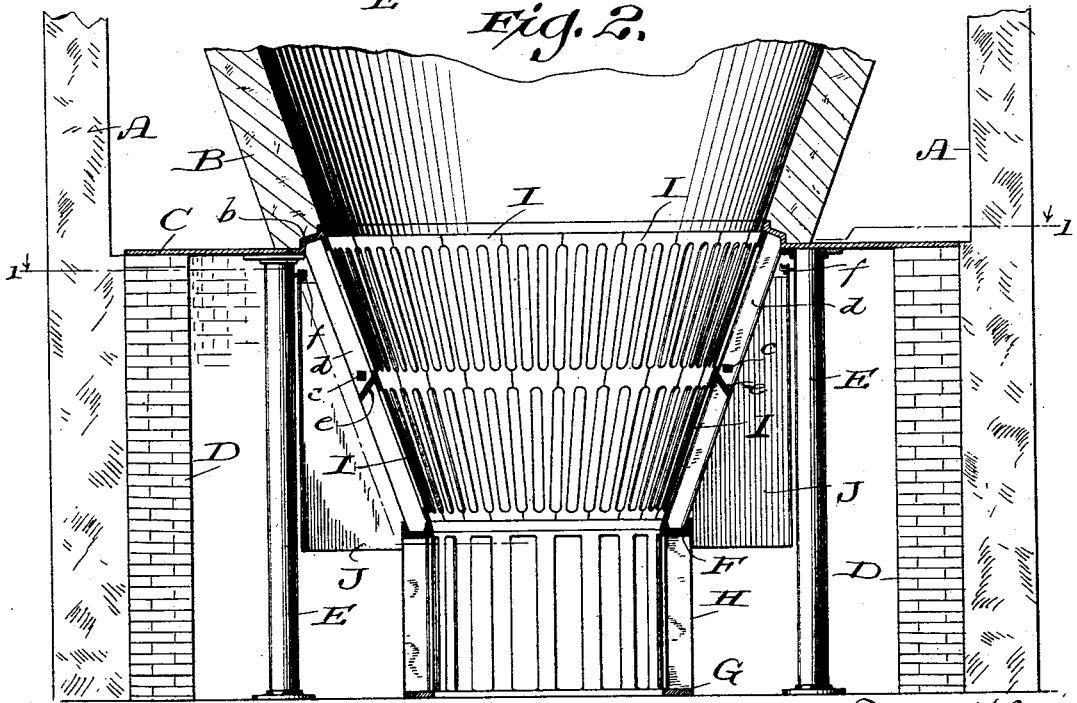

Figure 1 of the drawings represents a horizontal partly-sectional view of a cement-kiln embodying my improvements, the view being indicated by line 1 1 in Fig. 2; Fig. 2, a vertical transverse section of the kiln, the section being indicated by line 2 2 in Fig. 1; Fig. 3, an elevation of a portion of the kiln; Fig. 4, a detail view of a bar belonging to a grating that constitutes part of the kiln-pot; Fig. 5, a detail sectional view of a portion of the grating, the section being indicated by line 5 5 in Fig. 4; and Fig. 6, a perspective view of a cage also constituting part of the kiln-pot.

Referring by letter to the drawings, A represents the casing of a cement-kiln, this casing being either masonry or sheet metal, as may be found most convenient, supported by a suitable foundation.

The casing is a common feature of a cement-kiln, and the fireproof lining B for the same is herein shown built upon a horizontal apertured metal plate C of circular or other arbitrary shape, supported by a masonry wall D and metal columns E, it being also practical to have the plate of such area and support as to form a base for the aforesaid casing.

The lower or eye portion of the pot may be masonry, but it is preferable, as herein shown, to utilize a metal structure in the form of a cage comprising upper and lower horizontal rings F G, united by vertical bars H, it being practical to make this cage in one piece of cast metal.

The upper ring of the cage is provided with an angular recess for the reception of the lower ends of cast-metal longitudinally-apertured bars I, arranged to form a grating, and the upper ends of these bars rest in under an angular central elevation $b$ of the plate C above specified. The bars I are herein shown of such proportions, in a vertical direction, as to form a funnel-like grating when positioned intermediate of the plate C and lower eye portion of the pot, whether the latter be of masonry or a metallic cage. The bars I are fastened one to another in successive order by means of bolts $c$, run through apertured longitudinal outwardly-extending ribs $d$ of said bars, and the latter have transverse outwardly-extending stiffening-webs $e$ midway of their extremities, these webs being inclined in a downward direction for the purpose hereinafter specified. The grating being in sections bolted together, a burned-out or otherwise damaged section may be readily removed and a new one as readily substituted.

Sheet-metal shields J are herein shown hung from hooks $f$, extending inward from the columns E, and as these shields surround the grating above specified, they not only serve to protect workmen from calcined material passing through the interstices in said grating, but also to serve to prevent the kiln from being affected by sudden gusts of wind.

The entrance to the lower portion of the kiln is provided with a counterweighted door K, movable in vertical guides $g$, this door serving as a means to regulate draft to said kiln, and from the foregoing it will be understood that there is a large area of space intermediate of the pot and wall D of the kiln to provide for free admission of air to the grating and room in which workmen may operate.

In practice a proper amount of kindling and fuel is introduced from the top of the kiln, and the latter filled with alternate layers of fuel and material to be calcined, the shields J being removed when the kindling is ignited. After the fire has reached the top of the kiln and the bottom of the latter has cooled, the shields may be replaced, and the calcined material drawn out through the eye L of the pot, said kiln being replenished from the top as said material is drawn from time to time as long as said kiln is kept in operation.

By my construction and arrangement of parts free admission of air to the kiln is always assured regardless of meteorological or other conditions, whereas, in most cement-kilns ordinarily employed, air only enters through the eye; and as the latter is always filled with burnt rock of irregular size, there is a constantly varying and inadequate admission of air, the latter having a pass through irregular interstices in said burnt rock.

The openings for the admission of air to the interior of my improved kiln form an area considerably in excess of the area of the interstices in the material in the body of the kiln and thereby a uniform and rapid combustion is insured.

Some of the calcined material in the kiln escapes through the grating and the pitch of the transverse webs e of the grate-bars is such as to shed said material, in order to prevent choking of the longitudinal openings in said grating above said webs.

The support for the grating being of the cage form herein shown and described as preferable, the air can readily enter all around the extreme lower portion of the pot as well as through said grating and thereby better results are obtained, it being desirable to have as great an admission of air as is possible, in order to insure rapid, uniform combustion, an increase of capacity on the part of the kiln, and a saving of the waste that ordinarily occurs, while at the same time this free admission of a large quantity of air at all times causes the gases to pass off quickly and not permeate the material under treatment above the point of combustion to the detriment of the hydraulic properties. Hence the product is materially improved in the matter of quality. It has also been demonstrated that a kiln such as herein set forth requires considerably less fuel for a given amount of work than is usual with kilns of the ordinary and well-known construction.

Having thus described my invention, what I claim as new, and desire to secure by Letters Patent, is—

1. A cement-kiln provided with a fireproof lining and having its lower portion of masonry inclosing an air-space, metal columns within the air-space, an apertured metal plate supported by the masonry and columns to constitute a base for said lining, and a kiln-pot comprising a series of grate-bars that form its upper portion, these bars being laid against the lining-base around the aperture therein.

2. A cement-kiln provided with a fireproof lining and having its lower portion of masonry inclosing an air-space, metal columns within the air-space, an apertured metal plate supported by the masonry and columns to constitute a base for said lining, and a kiln-pot having its lower or eye portion in the form of a cast-metal cage surmounted by a series of grate-bars that are laid against the lining-base around the aperture therein.

3. A cement-kiln provided with a fireproof lining and having its lower portion of masonry inclosing an air-space, metal columns within the air-space, an apertured metal plate supported by the masonry and columns to constitute a base for said lining and having its aperture surrounded by an angular elevation, together with a kiln-pot that comprises a series of grate-bars having their upper ends laid in under the elevation of said lining-base.

4. A cement-kiln having an inclosed air-space at its base, and the kiln-pot arranged in said space having its upper portion made from a series of longitudinally-apertured bars proportioned to form a funnel-like grating and provided with transverse downwardly-inclined stiffening-webs intermediate of their extremities.

5. A cement-kiln having an inclosed air-space at its base, and the kiln-pot arranged in said space having its upper portion made from a series of longitudinally-apertured grate-bars provided with outwardly-extended longitudinal ribs and intermediate downwardly-inclined webs, said bars being proportioned to form a funnel-like grating and made fast to another by rib-connecting bolts.

6. A cement-kiln having an inclosed air-space at its base, a kiln-pot having a lower portion in the form of a cast-metal cage within the air-space and its upper portion made from a series of longitudinal cast-metal bars that are proportioned to form a funnel-like grating but have transverse downwardly-inclined stiffening-webs, and a suitably-supported metal plate having an aperture around which the aforesaid bars are supported at their upper ends, this plate constituting a base for the fireproof lining of said kiln.

In testimony that I claim the foregoing I have hereunto set my hand, at Milwaukee, in the county of Milwaukee and State of Wisconsin, in the presence of two witnesses.

HENRY CAMPBELL.

Witnesses:
N. E. OLIPHANT,
B. C. ROLOFF.